W. V. TURNER.
FLUID PRESSURE BRAKE.
APPLICATION FILED DEC. 30, 1916.
1,280,333.
Patented Oct. 1, 1918.
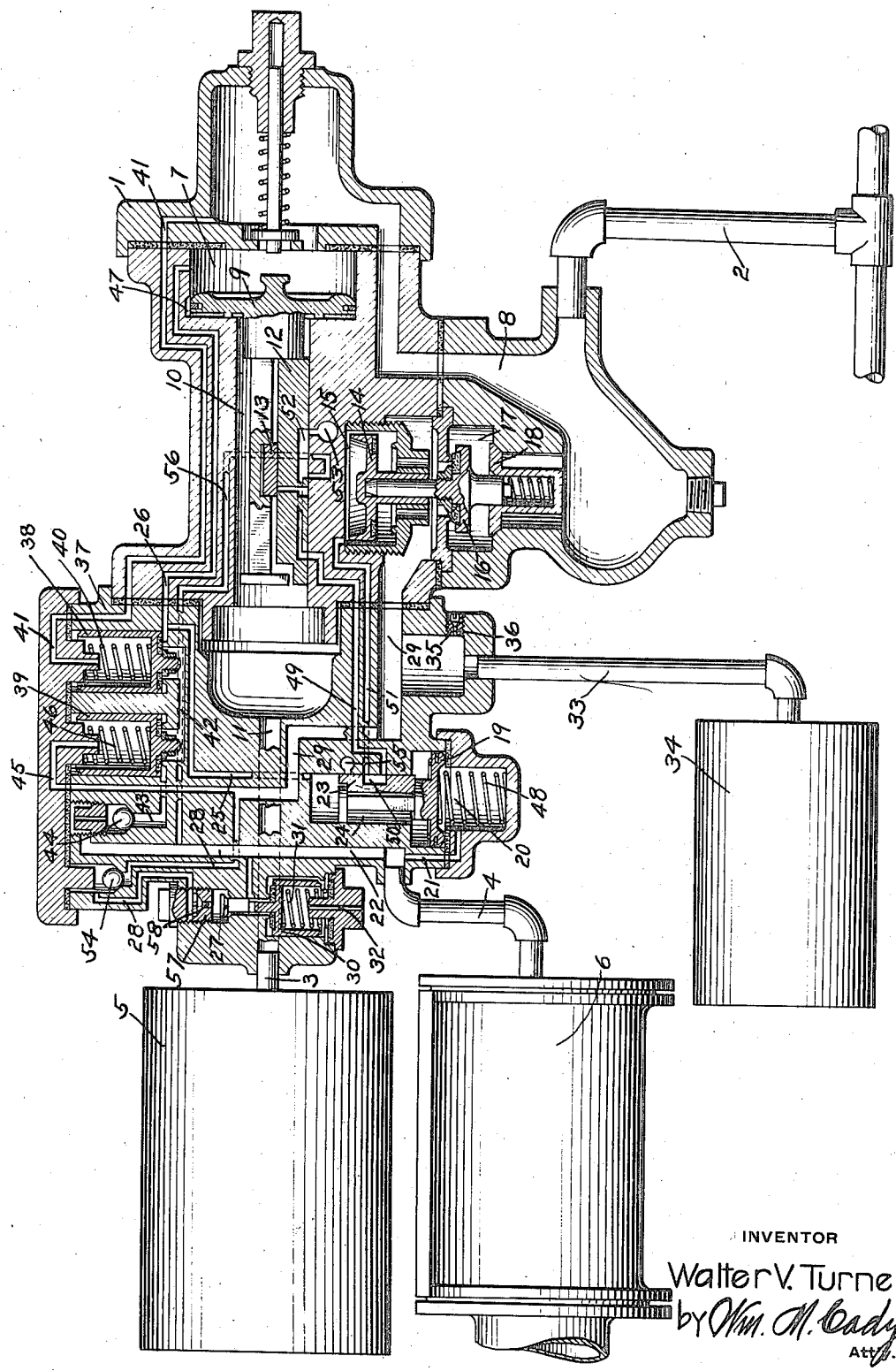
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,280,333.  Specification of Letters Patent.  Patented Oct. 1, 1918.

Application filed December 30, 1916. Serial No. 139,764.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a valve device adapted to effect an emergency application of the brakes.

When an emergency application of the brakes is made on a long train, the brakes are liable to be fully applied on the cars at the head end of the train, before the brakes are applied on the cars at the rear end of the train and as a consequence, the rear cars run into the front cars with considerable shock which often injures lading and equipment.

The principal object of my invention is to provide means for securing a more uniform application of the brakes throughout the train in an emergency application of the brakes, so as to obviate the above difficulty.

In the accompanying drawing, the single figure is a diagrammatic view, with the controlling valve device in section, of a car brake equipment embodying my invention.

As shown in the drawing, the car brake equipment may comprise a triple valve device 1 connected to brake pipe 2 and by the respective pipes 3 and 4 to an auxiliary reservoir 5 and a brake cylinder 6.

The triple valve device 1 may comprise a casing having a piston chamber 7 connected by passage 8 to brake pipe 2 and containing piston 9 and a valve chamber 10 connected by passage 11 to auxiliary reservoir 5 and containing a main slide valve 12 and a graduating slide valve 13 mounted on and having a movement relative to the main slide valve 12.

The triple valve casing also contains a quick action valve mechanism comprising a piston 14 loosely mounted in piston chamber 15 for operating a quick action valve 16 contained in valve chamber 17, the usual check valve 18 being interposed between the brake pipe passage 8 and said valve chamber.

According to my invention, communication through which fluid pressure in quick action piston chamber 15 is varied is controlled by a valve device mounted in a casing 37 secured to the triple valve casing 1 and having a piston 19 contained in piston chamber 20 connected by passage 21 with brake cylinder passage 22 and a slide valve 23 contained in valve chamber 24 which is connected by a passage 25 to a passage 26 leading to triple valve piston chamber 7.

Flow of air from the brake pipe to the brake cylinder is controlled by a valve 27 located in a passage 28 leading from vent passage 29 to brake cylinder passage 22 and said valve is adapted to be actuated by a piston 30, normally subject on one side over a restricted area to brake cylinder pressure and on the opposite side to the pressure of a spring 31, this side of the piston being open to the atmosphere through a passage 32.

Connected to the vent passage 29 by pipe 33 is a timing reservoir 34 and for slowly reducing the pressure in the timing reservoir, a choke plug 35 is provided having a restricted passage 36 leading from passage 29 to the atmosphere.

The casing 37 also contains valve pistons 38 and 39, the valve piston 38 being subject on one side to the pressure of a spring 40 and to fluid pressure supplied through a passage 41 leading to brake pipe passage 8.

The outer area of the opposite side of valve piston 38 is connected to passage 26 and the inner seated area to a passage 42 leading to the inner seated area of valve piston 39. The outer area of this side of valve piston 39 is connected by a passage 43 containing check valve 44 with brake cylinder passage 22 and the opposite side of said valve piston is connected by passage 45 with vent brake pipe passage 29 and is subject to the pressure of a spring 46.

In operation, when fluid is supplied to the brake pipe 2, the triple valve piston chamber is charged and fluid flows therefrom through the usual feed groove 47 around the triple valve piston 9 charging the valve chamber 10 and auxiliary reservoir 5.

The valve chamber 24 is also charged with fluid from the brake pipe supplied through passages 26 and 25 and since the opposite side of piston 19 is connected to the brake cylinder, the brake pipe pressure in valve chamber 24 normally maintains the piston in the position shown in the drawing, against the resistance of spring 48.

With piston 19 in the above position, valve 23 connects a passage 49 leading from the seat of slide valve 12 through cavity 50 with a passage 51 leading to quick action piston chamber 15 and main slide valve 12 in release position connects passage 49 through an extended cavity 52 with an exhaust port 53, so that normally the quick action piston 14 is subject to atmospheric pressure.

The valve piston 38 is held seated as shown by brake pipe pressure supplied through passage 41 and since the valve piston 39 is now subject on opposite sides to atmospheric pressure, spring 46 holds same in its seated position.

Upon a sudden reduction in brake pipe pressure to effect an emergency application of the brakes, the triple valve piston 9 moves the slide valve 12, so as to uncover passage 49 and permit flow of fluid from the auxiliary reservoir through cavity 50 and passage 51 to quick action piston chamber 15. The quick action piston 14 is then operated to open quick action valve 16, so that fluid is vented from the brake pipe by the lifting of check valve 18, through passage 29, passage 28, past check valve 54 and the open valve 27 to brake cylinder passage 22 and thence to the brake cylinder 6.

In order to prevent the too rapid build up of pressure in the brake cylinder by flow from the brake pipe, a choke 57 having a restricted port 58 is interposed in passage 28.

By providing the reservoir 34 into which fluid is vented from the brake pipe, serial quick action as heretofore obtained is retained, since quick venting of fluid from the brake pipe thus is secured, and at the same time, fluid supplied to the reservoir 34 is thereafter utilized as a source of supply for the slower venting of air to the brake cylinder until the valve 27 closes.

Since at the beginning of an emergency application of the brakes, the only fluid supplied to the brake cylinder is from the brake pipe through a restricted port as above described, the build up of pressure in the brake cylinder is slow, and this permits the brakes to be applied at the rear end of the train before a sufficient brake cylinder pressure is attained on the cars at the head end of the train to cause shocks by the running in of the rear cars.

When the brake cylinder pressure acting on the seated area of piston 30 has increased to a predetermined low degree, as determined by spring 31, the valve piston 30 will be shifted from its seat and since the full area is then exposed to brake cylinder pressure, the same will be promptly shifted to its outer seat, permitting the valve 27 to close and cut off the further admission of fluid from the brake pipe to the brake cylinder.

When brake pipe fluid flows to the brake cylinder it also flows to the timing reservoir 34 and through passage 45 to the spring side of valve piston 39.

The movement of triple piston 9 to emergency position, connects passage 26 with the auxiliary reservoir side of the piston, so that fluid at auxiliary reservoir pressure is supplied to the outer area of valve piston 38 while the opposite side of the piston is still subject to brake pipe pressure and when the brake pipe pressure has reduced to a predetermined degree, the auxiliary reservoir pressure overcomes the opposing brake pipe pressure and the valve piston 38 is lifted from its seat, exposing the full area to auxiliary reservoir pressure, so that said valve piston is promptly shifted to its outer seat, permitting fluid from the auxiliary reservoir to flow through passage 42 to the seated area of valve piston 39.

Fluid pressure supplied to the timing reservoir and to the spring side of valve piston 39 slowly escapes through the restricted port 36 and when the pressure has reduced to a predetermined degree, the auxiliary reservoir pressure admitted to the seated area of valve piston 39 will be sufficient to lift the same from its seat, exposing the full area to auxiliary reservoir pressure, so that the valve piston is quickly shifted to its outer seat, permitting fluid from the auxiliary reservoir to flow through passage 43, past check valve 44 to passage 22 and thence to the brake cylinder.

It will now be seen that flow of fluid from the auxiliary reservoir to the brake cylinder is delayed for a predetermined period of time sufficient to permit the bunching of the slack in the train, the length of time being dependent upon the size of the timing reservoir and the size of the restricted port 36.

The object of the valve piston 38 is to prevent the flow of fluid from the auxiliary reservoir to the valve piston 39 until the pressure in the timing reservoir and on the spring side of valve piston 39 has had time to build up to a sufficient degree to prevent the premature opening of same.

When the brake cylinder and auxiliary reservoir pressures acting on opposite sides of piston 19 have substantially equalized, the spring 48 will operate the piston and the valve 23 will be shifted so as to connect passage 51 with exhaust port 55. Fluid is thereupon vented from the quick action piston 14, so that the same is shifted to normal position, permitting the quick action valve 16 to close.

Upon increasing the brake pipe pressure to effect the release of the brakes, the triple valve piston 9 is shifted to release position, in which the brake cylinder is connected to the exhaust through passage 22, passage 56, cavity 52 and exhaust port 53.

Passage 26 is again connected to the brake pipe side of piston 9, so that fluid pressures on opposite sides of the valve piston 38 are equalized, permitting spring 40 to move same to its inner seat.

The release of fluid from the brake cylinder reduces the pressure on the upper face of valve piston 30, permitting spring 31 to shift same to its upper seat and thereby opening valve 27.

Having now described my invention, what I claim as new and desire to secure by Letters Patent is:—

1. In a fluid pressure brake, the combination with an auxiliary reservoir and brake cylinder, of a timing reservoir and a valve device operated upon a predetermined reduction in pressure in the timing reservoir for supplying fluid from the auxiliary reservoir to the brake cylinder.

2. In a fluid pressure brake, the combination with a brake pipe, auxiliary reservoir, and brake cylinder, of a timing reservoir adapted to be charged with fluid from the brake pipe in an emergency application of the brakes and a valve device operated upon a predetermined reduction in pressure in the timing reservoir for opening communication for supplying fluid from the auxiliary reservoir to the brake cylinder.

3. In a fluid pressure brake, the combination with a brake pipe, auxiliary reservoir, brake cylinder, and a quick action valve device operated upon a sudden reduction in brake pipe pressure for venting fluid from the brake pipe, of a timing reservoir having a restricted vent port and adapted to be charged with fluid vented from the brake pipe and a valve device operated upon a predetermined reduction in pressure in the timing reservoir for opening communication through which fluid is supplied from the auxiliary reservoir to the brake cylinder.

4. In a fluid pressure brake, the combination with a brake pipe and brake cylinder, of a valve mechanism for controlling the admission of fluid from the brake pipe to the brake cylinder in an emergency application of the brakes and operated upon a predetermined increase in brake cylinder pressure to a degree substantially less than the equalizing point for cutting off the supply of fluid from the brake pipe to the brake cylinder.

5. In a fluid pressure brake, the combination with a brake pipe, brake cylinder, and quick action valve device operated upon a sudden reduction in brake pipe pressure for venting fluid from the brake pipe, of a valve mechanism for controlling communication through which fluid vented from the brake pipe is supplied to the brake cylinder and operated at a predetermined brake cylinder pressure for cutting off the flow of fluid from the brake pipe to the brake cylinder.

6. In a fluid pressure brake, the combination with a brake pipe, auxiliary reservoir, and brake cylinder, of a quick action valve device operated upon a sudden reduction in brake pipe pressure for venting fluid from the brake pipe to the brake cylinder, a valve mechanism operated at a predetermined brake cylinder pressure for cutting off the flow of fluid from the brake pipe to the brake cylinder, a timing reservoir charged with fluid vented from the brake pipe, and a valve device operated upon a predetermined reduction in pressure in the timing reservoir for venting fluid from the auxiliary reservoir to the brake cylinder.

7. In a fluid pressure brake, the combination with a brake pipe, auxiliary reservoir, and brake cylinder, of a timing reservoir, a valve device operated upon a predetermined reduction in pressure in the timing reservoir for opening communication through which fluid is supplied from the auxiliary reservoir to the brake cylinder, and a valve device subject to the opposing pressures of the auxiliary reservoir and brake pipe and operated upon a predetermined reduction in brake pipe pressure for supplying fluid from the auxiliary reservoir to the first mentioned valve device.

8. In a fluid pressure brake, the combination with a brake pipe, auxiliary reservoir, brake cylinder, and a quick action valve device for venting fluid from the brake pipe upon a sudden reduction in brake pipe pressure, of a timing reservoir having a restricted vent port and adapted to be charged with fluid vented from the brake pipe, a valve device operated upon a predetermined reduction in pressure in the timing reservoir for opening communication for supplying fluid from the auxiliary reservoir to the brake cylinder, and a second valve device operated upon a predetermined reduction in brake pipe pressure for admitting fluid from the auxiliary reservoir to the first mentioned valve device.

In testimony whereof I hereunto set my hand.

WALTER V. TURNER.